United States Patent
Statz

Patent Number: 5,889,114
Date of Patent: Mar. 30, 1999

[54] THERMOPLASTIC ELASTOMERIC COMPOSITIONS

[75] Inventor: Robert Joseph Statz, Kennett Square, Pa.

[73] Assignee: E. I. du Pont de Nemours and Company, Wilmington, Del.

[21] Appl. No.: 21,741

[22] Filed: Feb. 23, 1993

Related U.S. Application Data

[63] Continuation-in-part of Ser. No. 315,291, Feb. 24, 1989, abandoned, which is a continuation-in-part of Ser. No. 193,630, May 13, 1988, abandoned.

[51] Int. Cl.⁶ .................................................. C08L 67/02
[52] U.S. Cl. .......................................... 525/166; 525/179
[58] Field of Search ...................... 525/166, 179

[56] References Cited

U.S. PATENT DOCUMENTS

| | | | |
|---|---|---|---|
| 4,172,859 | 10/1979 | Epstein | 428/402 |
| 4,275,180 | 6/1981 | Clarke | 525/173 |
| 4,284,540 | 8/1981 | Iida | 260/22 R |
| 4,310,638 | 1/1982 | Coran | 525/183 |
| 4,327,199 | 4/1982 | Coran et al. | 525/176 |
| 4,404,325 | 9/1983 | Mason et al. | 525/179 |
| 4,555,546 | 11/1985 | Patel | 525/194 |
| 4,694,042 | 9/1987 | McKee | 525/66 |
| 4,720,524 | 1/1988 | Ohmae et al. | 525/166 |
| 4,753,980 | 6/1988 | Deyrup | 525/166 |
| 4,771,106 | 9/1988 | Ohmae et al. | 525/166 |
| 4,914,152 | 4/1990 | Miyashita et al. | 525/166 |
| 4,981,896 | 1/1991 | Okada et al. | 525/166 |
| 5,004,782 | 4/1991 | Mashita et al. | 525/166 |

FOREIGN PATENT DOCUMENTS

| | | |
|---|---|---|
| 0168139 | 1/1986 | European Pat. Off. . |
| 0234819 | 2/1987 | European Pat. Off. . |
| 0258040 | 3/1988 | European Pat. Off. . |
| 57187350 | 11/1982 | Japan . |
| 59086677 | 5/1984 | Japan . |
| 59115352 | 7/1984 | Japan . |
| 2164342 | 3/1986 | United Kingdom . |
| WO 8503718 | 8/1985 | WIPO . |
| WO8803543 | 5/1988 | WIPO . |

*Primary Examiner*—Susan W. Berman
*Attorney, Agent, or Firm*—Craig H. Evans

[57] ABSTRACT

Grafted thermoplastic elastomer compositions formed by melt blending of a minor proportion of a thermoplastic material having a high softening point with a minor proportion of a glycidyl-containing copolymer, followed by melt blending of the thermoplastic material/glycidyl-containing copolymer blend with a major proportion of an acid-containing ethylene copolymer have a unique combination of unexpectedly good high temperature properties, compression set resistance and/or rebound.

1 Claim, No Drawings

THERMOPLASTIC ELASTOMERIC COMPOSITIONS

This is a continuation-in-part, of application Ser. No. 07/315,291 filed Feb. 24, 1989, now abandoned, which is a continuation-in-part of application Ser. No. 07/193,630, filed May 13, 1988, now abandoned.

TECHNICAL FIELD

This invention relates to certain grafted thermoplastic elastomer compositions which possess a unique combination of unexpectedly good high temperature properties, compression set resistance and/or rebound. While conventional flexible thermoplastics based on ethylene copolymers may have useful combinations of properties at room temperature, generally such materials exhibit severe deterioration of properties at high temperature, making these materials unsuited for applications such as automotive under-the-hood use.

More specifically, this invention relates to grafted thermoplastic elastomer compositions derived from a minor proportion of thermoplastic materials having a high softening point (i.e. glass transition temperature or crystalline melting point), a major proportion of ethylene copolymers containing an acid moiety and a minor proportion of a multi-functional polymeric grafting agent derived from epoxy functionalized ethylene copolymer, which grafting agent is capable of reacting with both the acid-containing ethylene copolymer and the high softening thermoplastic material. Hereafter in this application, the ethylene copolymers containing acid moiety shall be referred to as "acid-containing ethylene copolymer" and the multi-functional polymeric grafting agent shall be referred to as "glycidyl-containing copolymer." The compositions of the present invention will be multi-phase blends of the high softening thermoplastic material and the acid-containing ethylene copolymers which have been grafted to each other by the use of the glycidyl-containing copolymer.

The compositions of the present invention have potential for use in a wide range of flexible thermoplastics or as thermoplastic elastomers for molded or extruded items such as hose covers, seals and gaskets, wire jacketing, covers and/or cores for two-piece golf balls, toys and automotive body side moldings.

BACKGROUND ART

Japanese patent publication 59/115352 published Jul. 3, 1984 to Unitika discloses compositions of 100 parts by weight of a thermoplastic polyester, such as polyethylene terephthalate (PET) or polybutylene terephthalate (PBT); 1–50 parts by weight of an olefin/glycidyl(meth)acrylate copolymer, optionally also containing vinyl acetate; and 3–50 parts by weight of a polyolefin modified with up to 10 mole percent of an alicyclic carboxylic acid. The goal of the invention is a polyester-type resin composition with improved impact resistance. The composition of this publication is a thermoplastic engineering resin, while that of the present invention is a thermoplastic elastomer.

U.S. Pat. No. 4,172,859 granted Oct. 30, 1979 to Epstein, discloses a hard thermoplastic composition consisting of 60–99 weight percent thermoplastic polyester, toughened with a discrete soft elastomeric phase. Among the tougheners specifically disclosed are ethylene/vinyl acetate/glycidyl methacrylate (E/VA/GMA) and the zinc salt of E/iso-butyl acrylate (iBA)/methacrylic acid (MAA). Combinations of tougheners are permitted. This patent, however, does not disclose compositions with a minor proportion of polyester, nor recognize the need for sequential addition.

WO85/03718 published Aug. 29, 1985, discloses also a polyester rich (60–97%) composition, thus not a thermoplastic elastomer. The polyester is toughened with up to 40 weight percent of an ethylene copolymer such as E/n-butyl acrylate (nBA)/GMA. Less than 16% of an ionomer may be added as a nucleating agent. Again, no mention is made of sequential addition. The present invention is directed to soft flexible resins where the ionomer is the major component.

Japanese patent publication 57-187350 published Nov. 18, 1982 to Dainippon, discloses a blend of PET (100 parts by weight) with ionomer (0.1–15 parts by weight), aromatic polyester-polyether elastomer (0.5 to 25.0 parts by weight), and 0–10 parts by weight of polycarboxylic anhydrides, polyepoxides and/or polyisocyanates. The composition of the present invention has much less PET, and is a thermoplastic elastomer, rather than a toughened molding compound.

U.S. Pat. No. 4,284,540 granted Aug. 18, 1981 to Iida et al, discloses polyethylene terephthalate (PET) molding compositions which comprise PET resins, a copolymer of alpha-olefins and glycidyl ester and barium salt of fatty acids. This reference does not contain an acid copolymer or ionomer as does the present invention.

U.S. Pat. No. 4,555,546, granted Nov. 26, 1985 to Patel, discloses compatabilized polymer blends of olefin polymer, cross-linkable acrylic ester copolymer rubber, and a compatabilizing graft copolymer which is comprised of segments compatible with the olefin polymer and the copolymer rubber, respectively. However, nothing in Patel suggests the particular selection of ingredients which are used to make the compositions of the present invention, much less the particular quantitative limits specified for such ingredients, or the need for sequential addition of those ingredients.

U.S. Pat. No. 4,310,638, granted Jan. 12, 1982 to Coran et al, discloses thermoplastic elastomeric compositions comprising neutralized acrylic copolymer rubber modified with nylon. Coran discloses a simple two-component blend where one component comprises 60–98% neutralized acrylic rubber and the other component comprises 2–40% nylon. Coran does not recognize the significance of a third component which grafts the other two components together.

U.S. Pat. No. 4,694,042 granted Sep. 15, 1987 to McKee et al, discloses thermoplastic molding materials containing 5–50 parts by volume thermoplastic material as a coherent phase and 95–50 parts by volume of crosslinked emulsion polymerized elastomeric polymer. No mention is made of a GMA containing copolymer.

Japanese Patent Publication No. 59-086677 published May 18, 1984 to Sumitomo Chemical K.K., discloses blends of polyesters, glycidyl-containing ethylene copolymers and vinyl hydrocarbon polymers which have excellent adhesiveness, molding properties and workability. Those compositions, however, contain greater than 30% polyester and do not disclose an acid-containing ethylene copolymer. In addition, no mention is made of the importance of the order of addition of the components of the composition.

European Patent Publication No. 234819 published Sep. 2, 1987 to Sumitomo Chemical Company, Limited discloses binary blends of 5–59 parts polyamide and 95 to 41 parts of an acid-containing ethylene copolymer. No mention is made of a glycidyl-containing copolymer.

Great Britain Patent Publication No. 2,164,342, published Mar. 19, 1986 discloses a moldable composition comprising a blend of a resilient thermoplastic material and a potentially ionizable copolymer of ethylene and an alpha, beta-unsaturated carboxylic acid which is ionized. This reference does not contain a glycidyl-containing copolymer as does the present invention.

DISCLOSURE OF THE INVENTION

This invention relates to certain thermoplastic elastomer compositions which possess a unique combination of good high temperature properties, compression set resistance and/or rebound, while still remaining a thermoplastic.

The hardness range of the compositions can be influenced (independent of filler and plasticizer addition) by the selection and the ratio of the acid-containing ethylene copolymer used. For example, if the thermoplastic elastomer compositions of the present invention are based on relatively hard acid-containing ethylene copolymers, the compositions of the present invention will be stiff and rather hard (Shore D of 50 to 70). Conversely, if flexible acid-containing ethylene copolymers are used, the compositions of the present invention will be elastomeric in nature, and their Shore A hardness will range from about 70 to 90.

In addition, the hardness of the high softening point thermoplastic material can affect the final hardness of the compositions. However, since the high softening point thermoplastic material is present in a minor proportion, it will have a smaller effect than the acid-containing ethylene copolymer.

For compositions of the present invention intended for use in sealing applications, compression set values of less than 85% are desirable, preferably less than 60%. As can be seen from the Examples following, compression set can be influenced by not only the intrinsic characteristics of the dominant components but also by the type and quantity of the glycidyl-containing copolymer.

For compositions of the present invention intended for use in footware or golf-ball applications, compression set is unimportant; for footware, flex durability becomes significant; and for golf-ball applications, hardness (50–60 D) and percent rebound (~65–80) are important.

More specifically, the compositions of the present invention comprise thermoplastic elastomer compositions formed by melt blending under high shear the following components:

(a) 10–30 weight percent of at least one thermoplastic resin selected from polyesters, copolyetheresters, polyamides and copolyetheramides, the thermoplastic resin having a number average molecular weight of at least 5,000;

(b) 50–89 weight percent of at least one acid-containing ethylene copolymer, E/X/Y, where E is ethylene and comprises at least 40 weight percent of the ethylene copolymer, X is an unsaturated carboxylic acid 1–35 weight percent of the ethylene copolymer, and Y is a moiety derived from at least one alkyl acrylate, alkyl methacrylate, vinyl ether, carbon monoxide, sulfur dioxide, or mixtures thereof where the alkyl and ether radicals contain 1–12 carbon atoms, and Y comprises from 0–59 weight percent of the ethylene copolymer, and further wherein the acid groups in the unsaturated carboxylic acid, Component X, are neutralized from 0–80% by at least one metal ion; and (c) 1–22 weight percent of at least one glycidyl-containing copolymer, E/Z/Y', where Z is glycidyl methacrylate, glycidyl acrylate or glycidyl vinyl ether and comprises about 1–15 weight percent of the glycidyl-containing copolymer, and Y' is a moiety derived from at least one alkyl acrylate, alkyl methacrylate, vinyl ether, carbon monoxide, sulfur dioxide, or mixtures thereof where the alkyl and ether radicals contain 1–12 carbon atoms and Y' comprises 0–49 weight percent of the glycidyl-containing copolymer, and the remainder of the copolymer, E/Z/Y', consists of ethylene, The above stated weight percents being based on the total weight of components (a), (b) and (c) only, and further provided that component (a) comprises less than 25 volume percent of the total volume of components (a), (b) and (c).

Preferred compositions of the present invention comprise grafted thermoplastic elastomer compositions formed by melt blending under high shear:

(a) 12–30 weight percent of at least one thermoplastic resin, the thermoplastic resin having a number average molecular weight of at least 7,500; and being selected from polyamides, copolyetheramides, polyesters, and copolyetheresters;

(b) 57–86 weight percent of at least one acid-containing ethylene copolymer, E/X/Y, where E is ethylene and comprises at least 55 weight percent, X is an unsaturated carboxylic acid and comprises 3–30 weight percent of the ethylene copolymer, and Y is a moiety derived from at least one alkyl acrylate, alkyl methacrylate, or mixtures thereof where the alkyl radicals contain 1–8 carbon atoms and Y comprises 0–35 weight percent of the ethylene copolymer, and further wherein the acid groups in the unsaturated carboxylic acid, component X, are neutralized from 0–80% by at least one metal ion selected from the group consisting of sodium, zinc, magnesium, calcium, potassium, and lithium; and (c) 2–13 weight percent of at least one glycidyl-containing copolymer, E/Z/Y' where Z is glycidyl methacrylate, glycidyl acrylate or glycidyl vinyl ether and comprises about 5–10 weight percent of the glycidyl-containing copolymer, and Y is a moiety derived from at least one alkyl acrylate, alkyl methacrylate, vinyl ether, carbon monoxide, sulfur dioxide, or mixtures thereof where the alkyl and ether radicals contain 1–12 carbon atoms, and Y' comprises 0–49 weight percent of the glycidyl-containing copolymer, and the remainder of the copolymer, E/Z/Y', consists of ethylene, The above stated weight percents being based on the total weight of components (a), (b) and (c) only, and further provided that component (a) comprises less than 25 volume percent of the total volume of components (a), (b) and (c).

Most preferred compositions of the present invention comprise grafted thermoplastic elastomer compositions formed by melt blending under high shear:

(a) 15–27 weight percent of at least one thermoplastic resin, the thermoplastic resin having a number average molecular weight of at least 10,000; and being selected from polyamides, polyesters, and copolyetheresters, (b) 63–81 weight percent of at least one acid-containing ethylene copolymer, E/X/Y, where E is ethylene and comprises at least 60 weight percent of the ethylene copolymer, X is an acid-containing moiety selected from 5–15 weight percent of methacrylic and acrylic acid and, Y is a moiety derived from methyl acrylate, iso-butyl acrylate, or n-butyl acrylate and comprises 0–25 weight percent of the ethylene copolymer, and further wherein the acid groups in the unsaturated carboxylic acid, component X, are neutralized from 30–70% by at least one metal ion selected from sodium, zinc, magnesium, calcium and lithium; and (c) 4–10 weight percent of at least one glycidyl-containing copolymer, E/Z/Y' where Z is glycidyl methacrylate, glycidyl acrylate or glycidyl vinyl ether and comprises about 6–9 weight percent of the glycidyl-containing copolymer, and Y' is a moiety derived from at least one alkyl acrylate, alkyl methacrylate, vinyl ether, carbon monoxide, sulfur dioxide, or mixtures thereof where the alkyl and ether radicals contain 1–12 carbon atoms and Y' comprises 0–49 weight percent of the glycidyl-containing copolymer, and the remainder of the copolymer, E/Z/Y', consists of ethylene, The above stated weight percents being based on the total weight of components (a), (b) and (c).

The components described above are melt blended with each other under high shear with component (a) and component (c) blended together first, followed by the addition of component (b). This process can be done by sequential additions to an extruder or by a two-pass extrusion. The various ingredients may first be combined with one another in what is commonly referred to as a "salt and pepper" blend; i.e., a pellet blend of each of the ingredients, or they may be combined with one another via simultaneous or separate metering of the various components, or they may be divided and blended in one or more passes into one or more sections of mixing equipment such as an extruder, Banbury, Buss Kneader, Farrell Continuous Mixer, or other mixing equipment. For example, one can use an extruder with two or more feed zones into which one or more of the ingredients may be added sequentially. This is critical, that the thermoplastic resin, component (a), and the glycidyl-containing copolymer, component (c), be combined with each other first, and then the acid-containing ethylene copolymer, component (b), be added downstream. This helps promote the grafting reaction(s) between the thermoplastic resin, component (a), and the glycidyl-containing copolymer, component (c), prior to the reaction(s) between the component (c) and the acid-containing ethylene copolymer, component (b).

Polyamide resins suitable for use in the current invention include those described by U.S. Pat. No. 4,174,358 of Epstein and U.S. Pat. No. 4,338,413 and patents incorporated therein including U.S. Pat. Nos. 2,071,250, 2,071,251, 2,130,523, 2,130,948 2,241,322, 2,312,966, 2,512,606 and 3,393,210.

In addition, copolyetheramides consisting of a linear and regular chain of rigid polyamide segments and flexible polyether segments. The generalized chemical formula for these is:

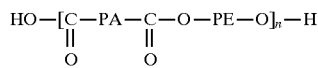

where PA represents the polyamide segment and PE represents the polyether segment.

Preferred polyamides include nylon 66, nylon 6, nylon 612, nylon 11, nylon 12, nylon 1212, amorphous nylons and nylon 666.

Most preferred polyamides include nylon 66, nylon 666, nylon 612 and nylon 6.

Polyester resins suitable for use in the present invention include those described in U.S. Pat. No. 4,172,859 of Epstein and PCT publication No. WO 85/03718. Copolyetherester polymers suitable for use in the present invention include those described in U.S. Pat. No. 4,221,703 of Hoeschele, and poly(etherimide esters) such as described by U.S. Pat. No. 4,556,705 of McCready. In addition, aromatic polyesters that are prepared from various ratios of iso-and terephthalic acids with bisphenol A can be used.

The preferred polyesters include polyethylene terephthalate; poly(1,4-butylene)terephthalate; and 1,4-cyclohexylene dimethyleneterephthalate/isophthalate copolymer and other linear homopolymer esters derived from aromatic dicarboxylic acids, including isophthalic, bibenzoic, napthalene-dicarboxylic including the 1,5-; 2,6-; and 2,7-napthalenedicarboxylic acids; 4,4'-diphenylenedicarboxylic acid; bis(p-carboxyphenyl) methane; ethylene-bis-p-benzoic acid; 1,4-tetramethylene bis(p-oxybenzoic) acid; ethylene bis(p-oxybenzoic) acid; 1,3-trimethylene bis(p-oxybenzoic) acid; and 1,4-tetramethylene bis(p-oxybenzoic) acid, and glycols selected from the group consisting of 2,2-dimethyl-1,3-propane diol; neopentyl glycol; cyclohexane dimethanol and aliphatic glycols of the general formula $HO(CH_2)_nOH$ where n is an integer from 2 to 10, e.g., ethylene glycol; 1,3-trimethylene glycol; 1,4-tetramethylene glycol; 1,6-hexamethylene glycol; 1,8-octamethylene glycol; 1,10-decamethylene glycol; 1,3-propylene glycol; and 1,4-butylene glycol. Up to 20 mole percent, as indicated above, of one or more aliphatic acids, including adipic, sebacic, azelaic, dodecanedioic acid or 1,4-cyclohexanedicarboxylic acid can be present. In addition, the preferred copolyetherester polymers are those prepared from dimethyl terephthalate, 1,4-butanediol, and poly(tetramethylene oxide) glycol having a molecular weight of about 600–2000 or poly(ethylene oxide) glycol having a molecular weight of about 600–1500. Optionally, up to about 30 mole % and preferably 5–20 mole % of the dimethyl terephthalate in these polymers can be replaced by dimethyl isophthalate. Other preferred copolyesters are those prepared from dimethyl terephthalate, 1,4-butanediol, and poly(propylene oxide) glycol having a molecular weight of about 600–1600. Up to 30 mole % and preferably 10–25 mole % of the dimethyl terephthalate can be replaced with dimethyl isophthalate or butanediol can be replaced with neopentyl glycol until up to about 30% and preferably 10–25% of the short chain ester units are derived from neopentyl glycol in these poly(propylene oxide) glycol polymers.

The most preferred polyesters have intrinsic viscosities of 0.5 to about 4.0 at 25° C. using o-chlorophenol as the solvent, and are based on polyethylene terephthalate homopolymers, polybutylene terephthalate homopolymers, polyethylene terephthalate polybutylene terephthalate copolymers, or polybutylene terephthalate block copolymers that contain one or more of the following glycols of 500 to 2500 molecular weight, polyethylene glycol, tetramethylene glycol or polypropylene glycol.

Suitable ethylene copolymers,E/X/Y, include ethylene/acrylic acid, ethylene/methacrylic acid, ethylene/acrylic acid/n-butyl acrylate, ethylene/methacrylic acid/n-butyl acrylate, ethylene/methyacrylic acid/iso-butyl acrylate, ethylene/acrylic acid/iso-butyl acrylate,ethylene/methacrylic acid/n-butyl methacrylate, ethylene/acrylic acid/methyl methacrylate, ethylene/acrylic acid/ethyl vinyl ether, ethylene/methacrylic acid/butyl vinyl ether ethylene/acrylic acid/methyl acrylate, ethylene/methacrylic acid/methyl acrylate, ethylene/methacrylic acid/methyl methacrylate, ethylene/acrylic acid/n-butyl methacrylate, ethylene/methacrylic acid/ethyl vinyl ether, ethylene/acrylic acid/butyl vinyl ether and ethylene/methyl acrylate/monoethylmaleate.

Preferred acid-containing ethylene copolymers include ethylene/methacrylic acid, ethylene/acrylic acid, ethylene/ methacrylic acid/n-butyl acrylate, ethylene/acrylic acid/n-butyl acrylate, ethylene/methacrylic acid/methyl acrylate and ethylene/acrylic acid/methyl acrylate copolymers. The most preferred acid-containing ethylene copolymers are ethylene/methacrylic acid, ethylene/acrylic acid, ethylene/methacrylic acid/n-butyl acrylate and ethylene/methacrylic acid/methyl acrylate copolymers.

The glycidyl containing copolymer, component (c), must be able to react with both component (b) and component (a). These polymeric grafting agents include ethylene copolymers copolymerized with one or more reactive moieties selected from unsaturated epoxides of 4–11 carbon atoms, such as glycidyl acrylate, glycidyl methacrylate, and vinyl glycidyl ether, and may additionally contain alkyl acrylate, alkyl methacrylate, carbon monoxide, sulfur dioxide and/or vinyl ether, where the alkyl radical is from 1–12 carbon atoms.

Preferred glycidyl containing copolymers for use in the compositions of the present invention include ethylene/glycidyl acrylate, ethylene/n-butyl acrylate/glycidyl acrylate, ethylene/methyl acrylate/glycidyl acrylate, ethylene/glycidyl methacrylate, ethylene/n-butyl acrylate/glycidyl methacrylate and ethylene/methyl acrylate/glycidyl methacrylate copolymers. The most preferred glycidyl-containing copolymer are ethylene/n-butyl acrylate/glycidyl methacrylate and ethylene/glycidyl methacrylate copolymers.

In addition to component (a), component (b) and component (c), discussed above, the thermoplastic elastomer compositions of the present invention may include other ingredients as are used in the conventional compounding of thermoplastics and/or ethylene copolymers, provided that such additional ingredients are no more than 100 parts by weight per 100 parts of the total of component (a) plus component (b) plus component (c). Examples of such other ingredients include carbon black, glass fibers, graphite fibers, Kevlar® aramid fibers, glass spheres, plasticizers, lubricants, silica, titanium dioxide, pigments, clay, mica and other mineral fillers, flame retardants, antioxidants, ultraviolet stabilizers, heat stabilizers and processing aids. Glass and Kevlar® fibers and barium sulfate are preferred.

Specific mention should be made of plasticizers which can be used to extend the hardness range of the compositions of the present invention. Plasticizers can comprise up to 30 parts per hundred of the total polymer in the composition and can be selected to plasticize any one or more phases in these multi-phase blends. Preferred plasticizers have low volatility, i.e., a boiling point of at least 200° C. Suitable plasticizers include phthalates, adipates, phosphates, glycolates, sulfonamides, trimellitates and epoxidized vegetable oil, epoxidized soybean oil or sunflower oil, dibutyl phthalate, dicyclohexyl phthalate, diethyl phthalate, diisodecyl phthalate, dimethyl phthalate, di(2-ethyl hexyl) phthalate, dialkyl adipate, tributoxyethyl phosphate, triphenyl phosphate, butyl glycolate, di-tridecyl-di-adipate, and mixed C7–C9 alkyl trimellitate.

In polyamide compositions, sulfonamide plasticizers are preferred in an amount of 1–7 weight percent. These include N-butyl benzyl sulfonamide, N-cyclohexyl-p-toluene sulfonamide, p-toluene sulfonamide, o,p-toluene sulfonamide, and N-ethyl-o,p-toluene sulfonamide. Specifically, these plasticizers aide in making the polyamide the continuous phase even when the polyamide is slightly less than one-quarter the system.

For plasticizers that are useful for the polyester and copolyetherester compositions of the present invention, see for example, U.K. patents 2,015,013 and 2,015,014 and PCT publication number WO 85/03718. Some examples of preferred plasticizers for polyester-based compositions of the present invention include polyethylene glycol 400 bis(2-ethoxyhexanoate), methoxy polyethylene glycol 550 2-ethylhexanoate and tetraethylene glycol bis(2-ethylhexanoate) but not limited to these.

Further, when compositions of the present invention are based on polyethylene terephthalate polyesters, a crystallization promoter may be added.

In the following examples, the various samples were prepared by combining the indicated ingredients in a "salt and pepper" blend, followed by extrusion in a 28 mm twin screw extruder using a high shear screw.

A number of physical properties were measured for each composition. Unless otherwise noted, the samples were prepared and tested as follows. Melt flow of the final graft copolymers and the grafting agents were determined according to ASTM D-1238. Tensile properties (tensile strength and elongation) at room temperature, 100° C., and 150° C. were measured by ASTM Procedure D-1708. All of the samples except those in Table IV were dry-as-molded. Samples were tested for volume swell in ASTM #1 and/or #3 oil at 100° C. according to ASTM D-471. Other tests performed include hardness (ASTM D-2240, readings taken at 6 seconds for samples in Table IV and at 0 seconds for all others), compression set (ASTM D-395 Method B) and Clash Berg Temperature (ASTM D-1043).

Also, for Table XI, additional tests used were PGA compression and percent rebound. PGA compression is measured with a machine designed to measure the deflection that a golf ball undergoes under compression. A known weight is fixed on a beam at a distance great enough to produce a 90.8 kg load in the golf ball and this lever is used to compress the ball. The ball is placed under a dial indicator that measures the deflection in thousands of an inch (0.00254 cm). This reading is taken as the ball is compressed. For example, a reading of 100 thousands of an inch equals a ball compression a 100. Percent Rebound is determined by dropping the ball core from an elevation of 254 cm onto a marble block. The percent recovery or vertical bounce is recorded and divided by the original height.

The thermoplastic resins, glycidyl-containing copolymers and acid-containing ethylene copolymers used in the Examples are defined in the following Tables I, II, and III.

In the following Examples, all percentages of component (a), component (b) and component (c) are given by weight. Where p-toluene sulfonamide powder plasticizer is used, it is indicated as "p-TSA" and is reported as parts per hundred resin (pph). All values originally obtained in British units have been converted to S.I. units and rounded, where appropriate; and finally, blanks or dashes in the tables denote either the absence of a particular component or that a particular test was not run.

For Table IV the blends were made in two separate passes on a 28 mm twin-screw extruder. All nylon components were dried in a vacuum oven overnight at 60° C. before blending. Blend components were weighed individually and mixed by shaking in a polyethylene bag before extruding. The mixture was sealed in aluminum-lined bags until further processing. First pass blends contained nylon 6, nylon 66, nylon 612, nylon 666 copolymer, or various mixtures of these nylons blended with ethylene(E)/27.6 n-butyl acrylate (nBA)/8.2 glycidyl methacrylate(GMA) or E/28 nBA/5.25 GMA and antioxidant. First pass compositions ranged as follows: 60–86 weight percent nylon, 39–13 weight percent ethylene/n-butylacrylate/glycidyl methacrylate (EBAGMA), and 1 weight percent N,N'-hexamethylene-bis- 3-(3,5-di-tert-butyl-4-hydroxy phenyl) propionamide. The extrusion melt temperature depended on the melting point of the nylon. A typical extrusion profile for the first pass of Examples 4-1 to 4-16 and 4-21 to 4-28, was as follows:

| Screw Speed (rpm) | Zone 1 Temp (°C.) | Zone 2 Temp (°C.) | Zone 3 Temp (°C.) | Zone 4 Temp (°C.) | Zone 5 Temp (°C.) | Die Temp (°C.) |
|---|---|---|---|---|---|---|
| 150 | 200 | 220 | 240 | 250 | 245 | 230 |

Melt Temperature: 240°–285° C.; Rate: 6–10 kg/hr

For examples 4-17 to 4-20 the first pass extrusion profile was about 5°–10° C. higher than that stated above with an expected melt temperature of 290° C. Hot extrusion strands were quenched in cold water and pelletized with a #20 Conair cutter. The blends were dried overnight in a vacuum oven at 60° C.

Second pass blends contained 17–29 weight percent of the first pass blends with the balance being:

(1) acid-containing ethylene copolymer A (Table II),
(2) acid-containing ethylene copolymer A and EBAGMA, or
(3) acid-containing ethylene copolymer A, EBAGMA and p-toluene sulfonamide.

Where the second pass included EBAGMA, this is indicated in Table IV under the Column "Fraction GMA in Second Pass". In addition, where two different EBAGMA compositions were used as indicated in Table IV column labelled component (c), the first indicated EBAGMA was used in the first pass and the second EBAGMA was used in the second pass. A typical extrusion profile for Examples 4-1 to 4-16 and 4-21 to 4-28 is as follows:

| Screw Speed (rpm) | Zone 1 Temp (°C.) | Zone 2 Temp (°C.) | Zone 3 Temp (°C.) | Zone 4 Temp (°C.) | Zone 5 Temp (°C.) | Die Temp (°C.) |
|---|---|---|---|---|---|---|
| 125 | 220 | 230 | 240 | 250 | 245 | 230 |

Melt Temperature: 270°–300° C.; Rate: 2–6 kg/hr

For the high melting nylons, Examples 4-17 to 4-20, the second pass extrusion profile was about 5° to 10° C. higher than that stated above with an expected melt temperature of 290° to 300° C. With second pass blends, it is critical to prevent high torque and to control hold-up time in the extruder. Samples exposed to long residence time in the extruder will crumble and degrade readily. As with first pass blends, strands were quenched in water and pelletized with a #20 Conair cutter. The blends were dried overnight in a vacuum oven at 60° C.

The pellets were injection molded into 1.59 mm or 3.18 mm plaques and die cut into test specimens for physical property evaluations. Typical molding conditions were a general purpose screw type, a screw speed of 60 rpm, a nozzle diameter of 3.97 mm, and an ambient hopper temperature. A typical injection molding temperature profile for Examples 4-1 to 4-16 and 4-21 to 4-28 was as follows:

| Rear Temp (°C.) | Center Temp (°C.) | Front Temp (°C.) | Nozzle Temp (°C.) | Mold Temp (°C.) |
|---|---|---|---|---|
| 240 | 250 | 250 | 250 | 40 |

Note: For Examples 4-17 to 4-20, the injection molding profile was about 5° to 10° C. higher than that stated above.

For Tables V, VI, VII, VIII and IX, blends were made in two separate passes on a 7.6 cm electrically heated roll mill operating at about 220°–230° C. Components (a) and (c) were blended in the first pass through the roll mill for approximately 2 to 3 minutes until the operator observed a homogeneous blend. Component (c) was then added in a second pass and blending was continued for a total of 5–10 minutes until the operator observed a homogeneous blend. The total weight of components (a), (b) and (c) in each of these roll mill samples was about 100 g.

The slab resulting from the roll mill blending was placed in a chase designed to produce 3.18 mm plaques (7.6 cm by 12.7 cm) and then the chase was placed in a hydraulic press and compression molded at a pressure of 275 MPa for 15 minutes at a temperature of 220° C. While maintaining the pressure, the plaques were cooled to room temperature and then removed and die cut into tensile bars or cylinders (for compression set measurements) as needed, for property evaluations.

For Table X the blends were made in two separate passes on a 28 mm twin-screw extruder. All polyester components were dried in a vacuum oven overnight at 60° C. before blending. Blend components were weighed individually and mixed by shaking in a polyethylene bag before extruding. The mixture was sealed in aluminum-lined bags until further processing. First-pass blends contained code G thermoplastic resin (Table I) blended with E/27.6 nBA/8.2 GMA or E/28 nBA/5.25 GMA. A typical extrusion profile for the first pass for Examples 10-1 and 10-2 was as follows:

| Screw Speed (rpm) | Zone 1 Temp (°C.) | Zone 2 Temp (°C.) | Zone 3 Temp (°C.) | Zone 4 Temp (°C.) | Zone 5 Temp (°C.) | Die Temp (°C.) |
|---|---|---|---|---|---|---|
| 100 | 156 | 222 | 232 | 238 | 232 | 240 |

Melt Temperature: 271° C.; Rate: 4.8 kg/hr; Pressure: 0.138 MPa

Second pass blends contained 36.4 weight percent of the first pass blends with acid-containing ethylene copolymer A (Table II) alone. A typical extrusion profile for the second pass for Examples 10-1 and 10-2 was as follows:

| Screw Speed (rpm) | Zone 1 Temp (°C.) | Zone 2 Temp (°C.) | Zone 3 Temp (°C.) | Zone 4 Temp (°C.) | Zone 5 Temp (°C.) | Die Temp (°C.) |
|---|---|---|---|---|---|---|
| 100 | 152 | 235 | 256 | 264 | 254 | 243 |

Melt Temperature: 274° C.; Rate: 3.4 kg/hr; Pressure: 1.79 MPa

The pellets were injection molded into 3.18 mm plaques and die cut into test specimens for physical property evaluation. Typical molding conditions used a general purpose screw type, a screw speed of 60 rpm, a nozzle diameter of 3.97 mm, and a representative molding profile for Examples 10-1 and 10-2 was as follows.

| Screw Speed rpm | Rear Temp (°C.) | Center Temp (°C.) | Front Temp (°C.) | Nozzle Temp (°C.) | Mold Temp (°C.) |
|---|---|---|---|---|---|
| 60 | 210 | 273 | 261 | 262 | 50 |

For Table XII the blends were made in two separate passes on a 28 mm twin-screw extruder which contains a stronger motor than the 28 mm twin screw extruder mentioned in the above Tables and is therefore better able to process these materials. All nylon components were dried in a vacuum oven overnight at 60° C. before blending. Blend components were weighed individually and mixed by shaking in a polyethylene bag before extruding. The mixture was sealed in an aluminum-lined bag until further processing. First pass blends contained nylon 66 blended with E/28 nBA/5.25 GMA and antioxidant. First pass compositions ranged as follows: 75–85 weight percent nylon 66, 15–25 weight percent ethylene/n-butylacrylate/glycidyl methacrylate (EBAGMA), and 1 weight percent N,N'-hexamethylene-bis-3-(3,5-di-tert-butyl-4-hydroxyphenyl) propionamide. A typical extrusion profile for the first pass, was as follows:

| Screw Speed (rpm) | Zone 1 Temp (°C.) | Zone 2 Temp (°C.) | Zone 3 Temp (°C.) | Zone 4 Temp °C. | Zone 5 Temp °C. | Die Temp (°C.) |
|---|---|---|---|---|---|---|
| 125 | 220 | 280 | 280 | 280 | 280 | 255 |

Melt Temperature: 282° C.; Rate: 6 kg/hr

Hot extrusion stands were quenched in cold water and pelletized with a #20 Conair cutter. The blends were dried overnight in a vacuum oven at 60° C.

Second pass blends contained 17–29 weight percent of the first pass blends with the balance being:

(1) acid-containing ethylene copolymer A (Table II)

(2) acid-containing ethylene copolymer A and EBAGMA, or (3) acid-containing ethylene copolymer A, EBAGMA and p-toluene sulfonamide A typical extrusion profile for the second pass was as follows:

| Screw Speed (rpm) | Zone 1 Temp (°C.) | Zone 2 Temp (°C.) | Zone 3 Temp (°C.) | Zone 4 Temp °C. | Zone 5 Temp °C. | Die Temp (°C.) |
|---|---|---|---|---|---|---|
| 125 | 220 | 260 | 270 | 270 | 270 | 225 |

Melt Temperature: 275°–290° C.; Rate: 4–6 kg/hr

As mentioned above, with second pass blends, it is critical to prevent high torque and to control hold-up time in the extruder. Samples exposed to long residence time in the extruder will crumble and degrade readily. As with first pass blends strands were quenched in water and pelletized with a #20 Conair cutter. The blends were dried overnight in a vacuum oven at 60° C.

The pellets were injection molded into 1.59 mm or 3.18 mm plaques and die cut into test specimens for physical property evaluations. Typical molding conditions were a general purpose, screw type, a screw speed of 60 rpm, a nozzle diameter of 3.97 mm, and an ambient hopper temperature. A typical injection molding profile was as follows:

| Rear Temp (°C.) | Center Temp (°C.) | Front Temp (°C.) | Nozzle Temp (°C.) | Mold Temp (°C.) |
|---|---|---|---|---|
| 250 | 270 | 270 | 270 | 50 |

TABLE I

THERMOPLASTIC RESIN
Component (a)

| Code | Identity | Densities (g/cc) |
|---|---|---|
| A | Nylon 66/Nylon 6 RV = 52 | 1.13 |
| B | Nylon 6 (low caprolactam) RV = 36 | 1.13 |
| C | Nylon 6, 6 RV = 50 | 1.14 |
| D | Nylon 6, 12 IV = 1.2 | 1.08 |

As used above, "RV" is relative viscosity (measured in formic acid 22 g polymer/100 ml of 90% formic acid viscosity measured in a Brookfield Viscometer), "IV" is intrinsic viscosity (measured in a meta cresol) and "Nylon 6 (low caprolactam)" is Nylon 6 which has been extracted to remove unreacted caprolactam.

The following thermoplastic resins (E–L) are copolyetheresters which are block copolymers containing units derived from the following percentages of terephthaloyl, isophthaloyl 1,4-butanediol, PTMEG-1000 or 2000 and polypropylene glycol. Terephthaloyl moiety is $C_8H_4O_2$, isophthaloyl moiety is $C_8H_4O_2$, PTMEG-1000 is polytetramethylene ether glycol having an average molecular weight of about 1,000; PTMEG-2000 is polytetramethylene ether glycol having an average molecular weight of about 2000, and polypropylene glycol is ethylene oxide capped poly(propylene oxide) having an average molecular weight of ~2000. In each of the copolyetheresters defined below, the difference between the sum of the named ingredients and 100% are conventional antioxidants and stabilizers as generally described above.

| Code | Identity | | Densities (g/cc) |
|---|---|---|---|
| E | 18.3% | terephthaloyl | 1.16 |
|  | 9.4% | 1,4-butanediol |  |
|  | 72.5% | PTMEG-2000 |  |
| F | 27.4% | terephthaloyl | 1.16 |
|  | 7.9% | isophthaloyl |  |
|  | 44.8% | PTMEG 2000 |  |
|  | 19.5% | 1,4-butanediol |  |
| G | 40.44% | terephthaloyl | 1.20 |
|  | 35.38% | PTMEG-1000 |  |
|  | 23.80% | 1,4-butanediol |  |
| H | 49.4% | terephthaloyl | 1.22 |
|  | 19.4% | PTMEG-1000 |  |
|  | 31.0% | 1,4-butanediol |  |
| I | 51.1% | terephthaloyl | 1.25 |
|  | 15.8% | PTMEG-1000 |  |
|  | 32.7% | 1,4-butanediol |  |
| J | 31.85% | terephthaloyl | 1.16 |
|  | 48.5% | PTMEG-2000 |  |
|  | 19.15 | 1,4-butanediol |  |
| K | 27.4% | terephthaloyl | 1.18 |
|  | 7.9% | isophthaloyl |  |
|  | 44.8% | polypropylene oxide capped with ethylene oxide units) Mn ~2200 |  |
|  | 19.5% | 1,4-butanediol |  |
| L | 15% | terephthaloyl | 1.16 |
|  | 6% | isophthaloyl |  |
|  | 67.7% | PTMEG-2000 |  |
|  | 11.6% | 1,4-butanediol |  |
| M |  | poly(-1,4-butanediol terephthalate) | 1.2 |

-continued

| Code | Identity | Densities (g/cc) |
|---|---|---|
| N | low molecular weight polyarylate | 1.22 |

The polyarylate used in Code N was derived from Bisphenol A and terephthalic acid with an average molecular weight of ~5000.

TABLE II

Acid-Containing Ethylene Copolymer Component (b)

| Code | Ethylene (wt %) | n-butyl Acrylate (wt %) | Methacrylic Acid (wt %) | Approx. Degree Neutralization | Ion |
|---|---|---|---|---|---|
| A | 66.9 | 24.5 | 8.6 | 50 | Na |
| B | 66.9 | 24.5 | 8.6 | 70 | Zn |
| C | 64.0 | 35 | 1.0 | | |
| D | 67.0 | 32 | 1.0 | | |
| E | 85.0 | — | 15.0 | 57 | Na |
| G | 90.0 | — | 10.0 | 50 | Na |

| Code | Ethylene (wt %) | Methyl Acrylate (wt %) | Mono-Ethyl Maleate (wt %) |
|---|---|---|---|
| F | 41.0 | 55.0 | 4.0 |

TABLE III

Glycidyl-Containing Copolymer Component (c)

| Code | Identity |
|---|---|
| A | E/27.6 n-butyl acrylate/8.2% glycidyl methacrylate |
| B | E/28.0 n-butyl acrylate/5.25% glycidyl methacrylate |
| C | E/31.0 n-butyl acrylate/5.3% glycidyl methacrylate |

All compositions in Table IV contained at least one nylon as component (a). Some of the compositions included p-toluene sulfonamide (p-TSA).

Examples 4-2 to 4-7 show the effect of varying component (c), the glycidyl-containing copolymer, both in its quantity and type. The greater the amount of component (c), the more cross-linking, thus, giving better compression set (Examples 4-4 and 4-5). Examples 4-8 to 4-11 show that when very high levels of component (c) are used, the addition of the plasticizer allows good processibility, but also increases the compression set. Absent plasticizer, these Examples would probably show poor processibility. For comparison, note that examples 4-12 and 4-13 show poor processibility when no plasticizer is used, however, there is good compression set. Also, 4-13 shows that Nylon 6 does not give as good compression set as Nylon 66/Nylon 6. Notice that in these two examples the test specimens were compression molded only for the sake of comparison. The compression set values obtained on compression molded test specimens are shown in parenthesis.

Examples 4-17 to 4-20 show that blending a high melting (stronger) nylon with a low melting nylon improves the processibility of the higher melting nylon. Also, it can be seen that the high temperature tensile properties of the composition are excellent, because the nylon is the continuous phase. The addition of the plasticizer decreases the viscosity of the nylon in the melt, thus aiding in making the nylon the continuous phase.

Finally, in Examples 4-21 and 4-22 it can be seen that the addition of p-TSA enables 4-22 to be processed, whereas the absence of plasticizer in 4-21 results in no processibility.

TABLE IV

| Sample | Comp. a (%) | Comp. b (%) | Comp. c (%) | Fraction GMA in first pass | Fraction GMA in second pass | p-TSA pph | Comp Set 70 hrs. 100 C. (compr mold) |
|---|---|---|---|---|---|---|---|
| 4-1 | A (10) | A (86) | A (2.9) | 1.0 | 0 | — | 90 |
| 4-2 | A (15) | A (82) | B (2.2) | 1.0 | 0 | — | — |
| 4-3 | A (15) | A (80) | B (4.5) | 0.5 | 0.5 | — | 72 |
| 4-4 | A (15) | A (77) | B (6.7) | 0.33 | 0.67 | — | 61 |
| 4-5 | A (15) | A (75) | B (9) | 0.25 | 0.75 | — | 50 |
| 4-6 | A (15) | A (81) | A (2.8) | 1.0 | 0 | — | 82 |
| 4-7 | A (15) | A (8.2) | A (4.2) | 1.0 | 0 | — | 79 |
| 4-8 | A (25) | A (53) | A (21.7) | 1.0 | 0 | 8 | 77 |
| 4-9 | A (25) | A (53) | A (21.7) | 1.0 | 0 | 8 | 77 |
| 4-10 | A (12.5)/B (12.5) | A (59) | A (16.3) | 1.0 | 0 | 8 | 97 |
| 4-11 | C (12.5)/B (12.5) | A (59) | A (16.3) | 0.7 | 0.3 | 8 | 87 |
| 4-12 | A (25) | A (63) | A (12) | 1.0 | 0 | — | 56 (39) |
| 4-13 | B (25) | A (63) | A (12) | 0.35 | 0.65 | — | (76) |
| 4-14 | A (25) | A (64) | B (10) | 0.47 | 0.53 | — | 70 |
| 4-15 | A (25) | A (63) | A (12) | 0.47 | 0.53 | 2 | 68 |
| 4-16 | A (26) | A (59) | B (14.5) | 0.2 | 0.8 | 4 | 79 |
| 4-17 | C (19.5)/B (6.5) | A (61) | A/B (11.5) | 0.48 | 0.52 | 4 | 77 |
| 4-18 | C (19.5)/B (6.5) | A (53) | A/B (19.8) | 0.3 | 0.7 | 4 | 72 |
| 4-19 | C (19.5)/D (6.5) | A (53) | A/B (19.8) | 0.3 | 0.7 | 4 | 71 |
| 4-20 | C (19.5)/B (6.5) | A (61) | A/B (11.2) | 0.48 | 0.52 | 2 | 77 |
| 4-21 | A (20) | A (69) | B (10.8) | 0.28 | 0.72 | — | — |

TABLE IV-continued

| | | | | | | | |
|---|---|---|---|---|---|---|---|
| 4-22 | A (20) | A (69) | B (10.8) | 0.28 | 0.72 | 2 | 55 |
| 4-23 | A (16.0)/C (4.0) | A (58) | B (21) | 0.14 | 0.86 | 6 | 64 |
| 4-24 | A (20.0)/C (5.0) | A (53) | B (19) | 0.20 | 0.80 | 2 | 68 |

| Samp. | Hardness Shore D | Processibility | Tensile Str. 23 C. MPa | Tensile Str. 150 C. MPa | 100% Modulus 23 C. MPa | 100% Modulus 150 C. MPa | % Elong Break 23 C. | % Elong Break 150 C. | % Oil Swell #3/70 h |
|---|---|---|---|---|---|---|---|---|---|
| 4-1 | 33 | good | 18.6 | | 6.1 | | 408 | | |
| 4-2 | 36 | good | 20.3 | 0.069 | 7.0 | | 412 | 125 | |
| 4-3 | 38 | good | 19.4 | 0.24 | 8.5 | | 337 | 116 | |
| 4-4 | 38 | good | 18.7 | 0.21 | 9.0 | | 295 | 65 | |
| 4-5 | 40 | good | 20.5 | 0.22 | 11.8 | | 257 | 40 | |
| 4-6 | 36 | good | 19.8 | 0.14 | 7.2 | | 377 | 142 | |
| 4-7 | 35 | good | 20.1 | | 7.4 | | 374 | | |
| 4-8 | 43 | good | 22.6 | 2.7 | 12.0 | 2.5 | 285 | 117 | 73 |
| 4-9 | 42 | good | 17.8 | 2.7 | 11.5 | 2.6 | 248 | 114 | 66 |
| 4-10 | 43 | good | 24.1 | 2.3 | 11.2 | 1.9 | 321 | 172 | 67 |
| 4-11 | 45 | good | 16.5 | 2.1 | 12.7 | 2.6 | 201 | 150 | 62 |
| 4-12 | 45 | fair/poor | 19.5 | 2.2 | 16.1 | | 150 | 79 | |
| 4-13 | 50 | fair | | | | | | | |
| 4-14 | 46 | poor/fail | | | | | | | |
| 4-15 | 47 | fair | 21.6 | 1.9 | 15.1 | | 210 | 78 | |
| 4-16 | 47 | fair | 17.9 | 5.4 | 15.4 | 4.5 | 228 | 141 | |
| 4-17 | 49 | fair/good | 25.8 | 6.0 | 17.8 | 4.6 | 243 | 103 | |
| 4-18 | 47 | fair/good | 20.9 | 5.3 | 16.4 | 4.6 | 233 | 119 | |
| 4-19 | 46 | fair | 22.6 | 5.3 | 16.4 | 4.8 | 211 | 119 | |
| 4-20 | 49 | fair/good | 16.5 | 5.6 | 18.5 | 4.7 | 226 | 139 | |
| 4-21 | | fail | | | | | | | |
| 4-22 | | fair | 17.0 | 1.5 | 12.3 | | 203 | 84 | |
| 4-23 | | fair | 16.6 | 2.1 | 12.2 | | 193 | 69 | |
| 4-24 | | fair | 19.6 | 2.8 | 14.6 | | 194 | 75 | |

The compositions in Table V consist of copolyetheresters as component (a), and show the criticality of component (c). In Example 5-1, no EBAGMA, component (c), was used and compression set could not be measured.

The compositions in Table VI consist of various copolyetheresters as component (a), and show in two separate sets for (Examples 6-1 to 6-7 and 6-8 and 6-9), the effects of varying the identity of component (a). Generally, compositions which contain softer, more flexible copolyetheresters, component (a), (for instance, Sample 6-2) have lower hardness and better compression set.

The composition in Table VII consists of a low molecular weight polyarylate or poly(1,4-butanediol terephthalate) as component (a).

The compositions in Table VIII show the effect when component (b) is varied in indentity but with the amount constant. Good compression set and low hardness are shown for each composition.

The compositions in Table IX each have the same chemical identity but the amounts for component (a) are slightly decreased from samples 9-1 to 9-3. As component (a) is decreased and component (c) is increased, compression set improves. Notice with the higher levels of component (c) the Melt Flow decreases.

The compositions in Table X demonstrate the utility of melt blending by extrusion The composition of Sample 11-2 in Table XI demonstrates utility as a golf ball core. Sample 11-1 is a control golf ball core supplied by Dunlop Sports Company, comparison to which can be used to evaluate suitability for that utility.

TABLE V

COMPOSITION EXAMPLES

| Sample | Comp a (%) | Comp b (%) | Comp c (%) | Melt Flow 220° C. 10 Kg | Compression Set 100° C. 22 hrs const. deflection |
|---|---|---|---|---|---|
| 5-1 | F (30) | A (70) | 0 | 30.2 | >100% deformed, by sticking to compression set device |
| 5-4 | F (29) | A (69) | A (2) | 0.50 | 20 |

TABLE VI

| Sample | Comp. a (%) | Comp. b (%) | Comp. c (%) | Compression Set % @ 100° C. 22 Hrs | Shore A Hardness | Melt Flow 240° C. 10 Kg |
|---|---|---|---|---|---|---|
| 6-1 | K (27.3) | A (63.6) | A (9.1) | 48 | 82 | 0.1 |
| 6-2 | L (27.3) | A (63.6) | A (9.1) | 31 | 78 | 0.03 |
| 6-3 | H (27.3) | A (63.6) | A (9.1) | 45 | 87 | 0.03 |
| 6-4 | I (27.3) | A (63.6) | A (9.1) | 49 | 88 | 0.03 |
| 6-5 | J (27.3) | A (63.6) | A (9.1) | 48 | 85 | 0.03 |
| 6-6 | F (27.3) | A (63.6) | A (9.1) | 46 | 83 | 0.03 |
| 6-7 | G (27.3) | A (63.6) | A (9.1) | 50 | 88 | 0.03 |

TABLE VI-continued

| | | | | | | |
|---|---|---|---|---|---|---|
| 6-8 | G (21.6) | A (59.7) | B (10.6) | 63 | 90 | — |
| 6-9 | H (21.6) | A (59.7) | B (10.4) | 60 | 91 | — |

| | Tensile Strength at Break | | % Oil Swell 70 hrs/100° C. | | Clash |
|---|---|---|---|---|---|
| Sample | 100° C. (MPa) | (% Elong) | ASTM No. 1 | ASTM No. 3 | Berg °C. |
| 6-1 | 1.9 | 150 | 37 | 134 | −30 |
| 6-2 | 1.6 | 140 | 39 | 164 | −33 |
| 6-3 | 1.9 | 100 | 32 | 110 | −23 |
| 6-4 | 1.9 | 130 | 35 | 130 | −10 |
| 6-5 | 2.0 | 130 | 37 | 132 | −30 |
| 6-6 | 1.8 | 100 | 33 | 172 | −30 |
| 6-7 | 1.4 | 150 | 32 | 129 | −22 |
| 6-8 | 1.9 | 183 | — | — | — |
| 6-9 | 2.6 | 193 | — | — | — |

TABLE VII

| Sample | Comp. a (%) | Comp. b (%) | Comp. c (%) | Compression Set % @ 100° C. 22 Hrs | Shore A Hardness | Melt Flow 240° C. 10 Kg |
|---|---|---|---|---|---|---|
| 7-1 | M (20) | A (70) | A (10) | 87 | 96 | 0.8 |
| 7-2 | N (25) | A (68) | A (7) | 68 | | |

| | Tensile Strength at Break | | | | | | Clash |
|---|---|---|---|---|---|---|---|
| | 100° C. | | @23° C. | | % Oil Swell 70 hrs/100° C. | | Berg |
| Sample | (MPa) | (% Elong) | (MPa) | (% Elong) | ASTM No. 1 | ASTM No. 3 | °C. |
| 7-1 | 3.1 | (67) | — | (145) | — | — | — |
| 7-2 | — | — | 19.7 | — | — | — | — |

TABLE VIII

| Sample | Comp. a % | Comp. b % | Comp. c % | Compression Set, % 22 hrs @100° C. | Shore A Hardness |
|---|---|---|---|---|---|
| 8-1 | G (28.4) | C (63.6) | A (8.0) | 33 | 70 |
| 8-2 | G (28.4) | D (63.6) | A (8.0) | 16.0 | 70 |
| 8-3 | G (28.4) | F (63.6) | A (8.0) | 35.0 | 80 |

TABLE IX

| Sample | Comp. a (%) | Comp. b (%) | Comp. c (%) | Compression Set % @100° C. 22 Hrs | Shore A Hardness | Melt Flow 240° C. |
|---|---|---|---|---|---|---|
| 9-1 | G (28.6) | A (66.7) | A (4.8) | 57 | 94 | 0.26 |
| 9-2 | G (27.3) | A (63.6) | A (9.1) | 50 | 93 | 0.04 |
| 9-3 | G (26.1) | A (60.9) | A (13.0) | 36 | 93 | 0.02 |

| | Tensile Strength at Break | | | | | | Clash |
|---|---|---|---|---|---|---|---|
| | 100° C. | | @23° C. | | % Oil Swell 70 hrs/100° C. | | Berg |
| Sample | (MPa) | (% Elong) | (MPa) | (% Elong) | ASTM No. 1 | ASTM No. 3 | °C. |
| 9-1 | 0.9 | (150) | 21.7 | (372) | | | |
| 9-2 | 1.9 | (170) | 24.5 | (368) | 36 | 118 | −15 |
| 9-3 | 2.8 | (90) | 16.5 | (187) | 31 | 115 | −15 |

TABLE X

| Sample | Comp. a (%) | Comp. b (%) | Comp. c (%) | Compression Set % @ 100° C. 22 Hrs | Melt Flow 240° C. 10 Kg | Tensile Strength at Break 100° C. (MPa) | (% Elong) | @23° C. (MPa) | (% Elong) |
|---|---|---|---|---|---|---|---|---|---|
| 10-1 | G (25.5) | A (63.6) | A (10.9) | 46 | no flow | 2.6 | (140) | 20.0 | (300) |
| 10-2 | G (27.3) | A (63.6) | A (9.1) | 45 | no flow | 2.7 | (140) | 20.7 | (270) |

TABLE XI

| Sample | Comp. a (wt %) | Comp. b (wt %) | Comp. c (wt %) | Filler[1] pph | Shore D Hardness | Compression (PGA) | % Rebound | Density (g/cc) |
|---|---|---|---|---|---|---|---|---|
| 11-1 | * | * | * | — | 68 | 100 | 78.0 | 1.19 |
| 11-2 | E (27.2) | E (63.9) | C (9.1) | 22.4 | 64 | 122 | 66.3 | 1.15 |

*Control core which is a thermoset material is composed of cis-1,4-polybutadiene rubber, zinc acrylate, zinc methacrylate and zinc oxide cured with dicumyl peroxide.
[1]Filler is barium sulfate.

All compositions in Table XII contained nylon 66 as component (a). One of the compositions included p-toluene sulfonamide (p-TSA) namely, Example 12-4.

Examples 12-2 and 12-3 show the effect of varying the type of component (b), the acid-containing ethylene copolymer. In addition, Examples 12-2 and 12-3 show that E(66%)/n-BA(24.5%)/MAA(8.6%) neutralized 50% with a sodium ion is preferred.

The plasticizer in Example 12-4 allows good processibility, but also increases the compression set. In Example 12-4, it can be seen that the high temperature tensile properties of the composition are excellent. The addition of the plasticizer decreases the viscosity of the nylon in the melt which enhances the ability of the nylon to become co-continuous.

as specified in ASTM D-395, Method B to run compression set tests. Compression set measurements in Table III were obtained after holding cylinders in their compressed state for 22 hours at 100° C. using a 10 kilogram weight.

As can be seen from the test data, Samples 13-1, 13-2 and 13-3, employing magnesium oxide (MgO), show either poor compression set resistance or poor melt flow. In contrast, Samples 13-4 and 13-5, employing ethylene/n-butyl acrylate/glycidyl methacrylate copolymer, show a better combination of compression set resistance and melt flow.

TABLE XII

| Sample | Comp. a (%) | Comp. b (%) | Comp. c (%) | Fraction GMA in first pass | Fraction GMA in second pass | p-TSA pph | Comp Set 70 hrs. 100 C |
|---|---|---|---|---|---|---|---|
| 12-1 | C (15) | A (78) | B (6.7) | 0.61 | 0.39 | — | 52 |
| 12-2 | C (15) | A (76) | B (9.0) | 0.68 | 0.32 | — | 49 |
| 12-3 | C (15) | G (76) | B (9.0) | 0.68 | 0.32 | — | 87 |
| 12-4 | C (25) | A (64) | B (10.8) | 0.60 | 0.40 | 2 | 70 |

| Samp. | Hardness Shore D | Processibility | Tensile Str. 23 C MPa | Tensile Str. 150 C MPa | 100% Modulus 23 C MPa | % Elong Break 23 C MPa | % Elong Break 150 C |
|---|---|---|---|---|---|---|---|
| 12-1 | 38 | fair/good | 18.4 | 0.63 | 10.1 | 259 | 88 |
| 12-2 | 39 | fair/good | 15.5 | 0.70 | 9.7 | 222 | 74 |
| 12-3 | 53 | fair/good | 23.4 | 0.23 | 18.5 | 208 | 170 |
| 12-4 | 48 | fair/good | 16.6 | 2.3 | 15.9 | 149 | 65 |

All compositions in Table XIII were made by blending the resins and additives as indicated in the table on a Haake internal mixer at a temperature of 225° to 235° C. for 10 minutes until homogenious. The resin samples were removed from the mixer and compression molded into ¼ inch plagues. The samples were then die cut into cylinders

TABLE XIII

| Sample | PBT % | VAMAC® Wt. % | MgO Wt. % | E/nBA/GMA Wt. % | COMP. SET % | MELT FLOW |
|---|---|---|---|---|---|---|
| 13-1 | 29.6 | 69 | 0.9 | | 92.9 | 2.48 |
| 13-2 | 24.6 | 74 | 0.9 | | 100.7 | 0.177 |

TABLE XIII-continued

| Sample | PBT % | VAMAC ® Wt. % | MgO Wt. % | E/nBA/GMA Wt. % | COMP. SET % | MELT FLOW |
|---|---|---|---|---|---|---|
| 13-3 | 38.6 | 63 | 0.9 | | 54.7 | 0.0177 |
| 13-4 | 27 | 67 | | 6 | 84.5 | 0.358 |
| 13-5 | 22 | 72 | | 6 | 65.4 | 1.492 |

In Table XIII, the PBT used is polt(-1,4-butanediol terephthalate). The VAMAC® ethylene acrylic elastomer used is that described above in Table II, Code F (41 wt. % ethylene, 55 wt. % methyl acrylate, 4.0 wt. % mono-ethyl maleate). The E/nBA/GMA used is as described above in Table III, Code B (E/28.0% n-butyl acrylate/5.25% glycidyl methacrylate).

What is claimed is:

1. A grafted multi-phase, thermoplastic elastomer composition formed by melt-blending:
   (a) 10–30 weight percent of at least one thermoplastic resin selected from polyesters and copolyetheresters, the thermoplastic resin having a number average molecular weight of at least 5000;
   (b) 50–89 weight percent of at least one acid-containing ethylene copolymer, E/X/Y, where E is ethylene and comprises at least 40 weight percent of the ethylene copolymer, X is an unsaturated carboxylic acid, and comprises 1–35 weight percent of the ethylene copolymer, and Y is a moiety derived from at least one alkyl acrylate, alkyl methacrylate, vinyl ether, carbon monoxide, sulfur dioxide, or mixtures thereof where the alkyl and ether radicals contain 1–12 carbon atoms, and Y comprises from 0–59 weight percent of the ethylene copolymer, and further wherein the acid groups in the unsaturated carboxylic acid, Component X, are neutralized from 0–80% by at least one metal ion; and
   (c) 1–22 weight percent of at least one glycidyl-containing copolymer, E/Z/Y', where Z is glycidyl methacrylate, glycidyl acrylate or glycidyl vinyl ether and comprises about 1–15 weight percent of the glycidyl-containing copolymer, and Y' is a moiety derived from at least one alkyl acrylate, alkyl methacrylate, vinyl ether, carbon monoxide, sulfur dioxide, or mixtures thereof where the alkyl and ether radicals contain 1–12 carbon atoms and Y' comprises 0–49 weight percent of the glycidyl-containing copolymer, and the remainder of the copolymer, E/Z/Y', consists of ethylene, the above stated weight percents being based on the total weight of components (a), (b) and (c) only, and further provided that component (a) comprises less than 25 volume percent of the total volume of components (a), (b) and (c).

* * * * *